(12) United States Patent
Eubanks

(10) Patent No.: US 6,880,287 B2
(45) Date of Patent: Apr. 19, 2005

(54) FISHING LURE

(76) Inventor: Calvin W. Eubanks, 41754 W. 51st St. South, Jennings, OK (US) 74038

( * ) Notice: Subject to any disclaimer, the term of this patent is extended or adjusted under 35 U.S.C. 154(b) by 0 days.

(21) Appl. No.: 10/429,034

(22) Filed: May 5, 2003

(65) Prior Publication Data

US 2004/0221502 A1 Nov. 11, 2004

(51) Int. Cl.⁷ .............................................. A01K 85/00
(52) U.S. Cl. ..................................... 43/42.13; 43/42.24
(58) Field of Search .............................. 43/42.13, 42.11

(56) References Cited

U.S. PATENT DOCUMENTS

| | | | | |
|---|---|---|---|---|
| 1,295,617 A | * | 2/1919 | Shannon | 43/42.4 |
| 1,547,619 A | * | 7/1925 | Shannon | 43/42.24 |
| 1,734,883 A | | 11/1929 | Shannon | 43/42.06 |
| 2,203,473 A | * | 6/1940 | Shannon | 43/42.06 |
| 3,253,363 A | * | 5/1966 | Steehn | 43/42.13 |
| 3,257,750 A | | 6/1966 | Shannon | 43/42.06 |
| 3,747,256 A | * | 7/1973 | Haddock | 43/42.13 |
| 4,037,345 A | * | 7/1977 | Dubois | 43/42.13 |
| 4,133,135 A | * | 1/1979 | Miles | 43/42.13 |
| 4,209,932 A | * | 7/1980 | Pate | 43/42.11 |
| 4,619,068 A | * | 10/1986 | Wotawa | 43/42.11 |
| 4,823,501 A | | 4/1989 | Standish, Jr. | 43/42.31 |
| 4,884,358 A | * | 12/1989 | Grove et al. | 43/42.13 |
| 5,050,334 A | * | 9/1991 | Standish, Jr. | 43/42.13 |
| 5,355,612 A | | 10/1994 | Smith | 43/42.13 |
| 5,930,941 A | * | 8/1999 | Hayes II et al. | 43/42.13 |
| 6,155,000 A | | 12/2000 | Ravencroft | 43/42.31 |
| 6,266,914 B1 | * | 7/2001 | Johnson et al. | 43/42.13 |
| 6,701,662 B1 | * | 3/2004 | Moore | 43/42.13 |

* cited by examiner

Primary Examiner—Peter M. Poon
Assistant Examiner—Bethany L. Griles
(74) Attorney, Agent, or Firm—Richard C. Litman

(57) ABSTRACT

The fishing lure is a spinnerbait type of fishing lure having twin spinner blades supported by supporting wires designed to increase the vibration and action of the fishing lure. The spinner blades are positioned side-by-side, above a weighted lure body, skirt, and hook, so that as the blades spin they make frequent contact with one another to produce a clicking noise. The fishing lure thus combines the flash and noise of the spinner blades with vibration and action of the lure to better attract fish in a wide range of circumstances.

6 Claims, 3 Drawing Sheets

FISHING LURE

BACKGROUND OF THE INVENTION

1. Field of the Invention

The present invention relates to fishing lures. More specifically, the invention is a spinnerbait type of fishing lure having a pair of spinner blades disposed in an arrangement to increase the lure's ability to attract fish by improved sound, vibration, and action of the bait.

2. Description of the Related Art

Spinnerbait fishing lures have gained great popularity among sport fishermen. Spinnerbait lures are highly versatile, and are useful to catch a wide variety of fish in numerous different situations. Common to all types of spinnerbait lures is the use of one or more spinner blades that create vibrations and flashes of light to attract the attention of fish as the lure is pulled through the water. Some spinnerbaits have also employed sound, incorporating various devices to generate noises as the lure moves in order to attract fish. It is typical for a spinnerbait to have a weighted body, often with a skirt of strings, foil strips, strips of rubber or plastic, or other material trailing from the weighted body. The general movement, or "action", of the weighted body and skirt along with the spinner blades and other parts of the lure contributes to induce fish to strike the lure.

U.S. Pat. No. 6,155,000, issued on Dec. 5, 2000 to G. Ravencroft, illustrates the most typical configuration of a spinnerbait lure. A single spinner blade is held above the lure's weighted body and skirt by a "V" shaped wire harness. Rather than a conventional spinner blade, however, the lure uses a rattle body having a shape similar to familiar spinner blades but with a hollow interior containing metal shot or other material in rattle chambers. While conventional spinner blades are generally intended to spin in a full 360° circle when the lure is pulled through the water, the rattle body blade is restricted in its motion. Thus, while the rattle body generates noise, the restricted motion of the rattle body decreases the degree of flash produced by the moving blade and likely attenuates the amount of vibration and lure "action" that is generated.

U.S. Pat. No. 5,355,612, issued on Oct. 18, 1994 to S. Smith, discloses a spinner fishing lure having an extension to the typical "V" shaped wire spinner blade holder that allows two spinner blades to be attached in a vertical plane above the weighted body of the lure. The spinner blades are arranged so that as they spin, the blades periodically strike one another to produce a noise. While the twin-blade arrangement creates nose to attract fish, this lure does not depart from the traditional spinnerbait lure with a "V" shaped spinner blade holder in a manner to increase the vibration and overall "action" generated by the lure. Additionally, the vertical extension of the wire holding the spinner blades is likely to increase line. entanglements as the lure is cast.

U.S. Pat. No. 1,734,883, issued on Nov. 5, 1929 to J. P. Shannon, discloses a fishing lure that has two spinner blades, positioned side-by-side in a horizontal plane above a weighted lure body. The spinner blades are held in position by a "V"-shaped yoke that is attached to a wire extending from the front of the weighted body. The primary purpose of this arrangement appears to be to position the spinner blades away from the hook, so that the spinner blades don't interfere with hooking fish. The blades are not disposed in a manner to create noise or to increase vibration and action of the lure.

U.S. Pat. No. 3,257,750, issued on Aug. 24, 1964 to J. M. Shannon, illustrates a twin-bladed fishing lure that is similar to the J. P. Shannon lure discussed above, but uses an alternative method of attaching the "V"-shaped yoke. The subject of the J. M. Shannon patent is a uniquely shaped spinner blade intended to produce increased vibration.

Buzzbait fishing lures are also well known to sport fishermen. Buzzbait lures typically have a configuration similar to spinnerbait lures, but use rotating "propeller-like" blades instead of the spinner blades. Unlike spinnerbait lures, where the spinner blades are usually located above the lure's weighted body, the rotating blades of a buzzbait lure are typically located ahead of the lure's weighted body. As with spinnerbait lures, buzzbaits often use only a single blade. Double-bladed buzzbaits may use two blades in-line or side-by-side. An example of a buzzbait lure is the audible fishing lure disclosed in U.S. Pat. No. 4,823,501, issued on Apr. 25, 1989 to C. Standish Jr. The lure uses a pair of rotating blades, trailed side-by-side from an upright "V"-shaped support. The rotating blades are disposed so that they make contact as they rotate, producing a noise.

As demonstrated by the volume of patents issued for fishing lures, no single lure has been developed yet which combines the appropriate combination of features in terms of visual features, vibration, movement, and sound satisfactory for fishing. None of the above inventions and patents, taken either singly or in combination, is seen to describe the instant invention as claimed. Thus a fishing lure solving the aforementioned problems is desired.

SUMMARY OF THE INVENTION

The fishing lure of the present invention is a spinnerbait type of fishing lure having twin spinner blades supported by supporting wires designed to increase the vibration and action of the fishing lure. The spinner blades are positioned side-by-side, above a weighted lure body, skirt, and hook, so that as the blades spin they make frequent contact with one another to produce a clicking noise. The fishing lure thus combines the flash and noise of the spinner blades with vibration and action of the lure to better attract fish in a wide range of circumstances.

The fishing lure has a weighted body with a trailing hook and skirt, in a configuration generally similar to known spinnerbait lures. Unlike other spinnerbait lures which utilize a single wire branching into a V-shaped yoke, the lure of the present invention has two wire members extending forward from the weighted body for supporting the spinner blades. Each wire supports a single spinner blade. Each support wire is formed with a forward extending portion that extends forward from the weighted body to an eye loop for tying a fishing line onto the lure, the loop being formed by bending the wire back on itself to form the eye loop. From the eye loop, the wire bends upward to form an upright portion. From the upright portion the wire bends rearward and terminates in a loop where the spinner blade is attached.

The independent forward and rearward extending portions of the spinner blade supporting wires add flexibility that promotes vibration of the spinner blades and increases action of the lure body, as well as allowing the spinner blades to make more frequent contact with each other, as the lure is dragged through the water. The flexibility of the spinner blade supporting wires creates substantial vibration, spinner blade noise, and lure body action even when smaller spinner blades are used. Smaller spinner blades are preferred when the lure will be retrieved quickly, whereas larger blades are preferred when the lure will be retrieved slowly.

Additionally, water depth, clarity, and other factors may favor spinner blades of differing size and shape.

Accordingly, it is a principal object of the invention to provide a fishing lure that has an increased ability to attract fish.

It is another object of the invention to provide a fishing lure that generates increased spinner blade noise to increase its attractiveness to fish.

It is a further object of the invention to provide a fishing lure that generates increased vibrations to increase its attractiveness to fish.

Still another object of the invention is to provide a fishing lure that generates increased body action to increase its attractiveness to fish.

Yet another object of the invention is to provide a fishing lure that may be effectively used with spinner blades of a variety of sizes and shapes.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
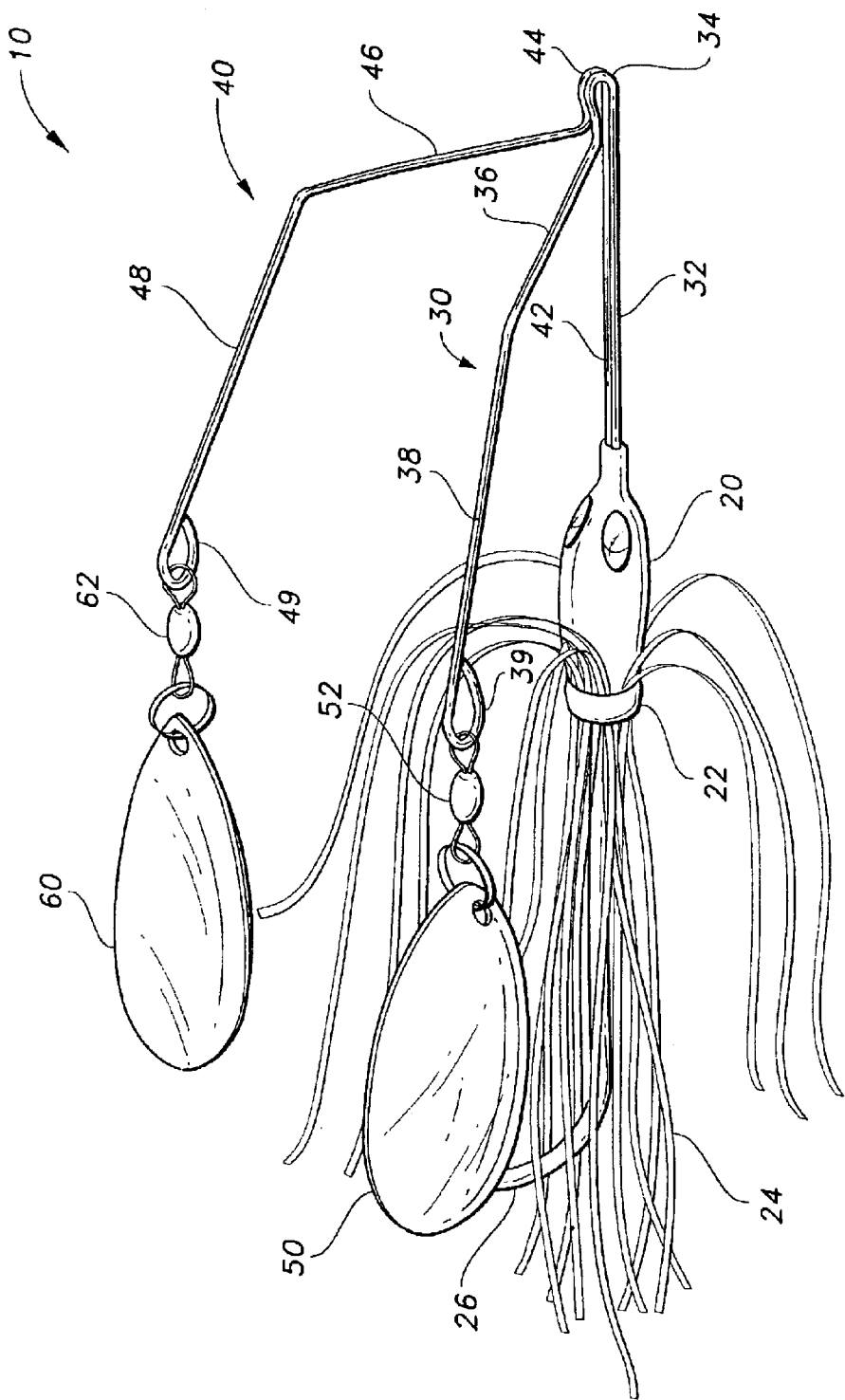
FIG. 1 is a perspective view of a fishing lure according to the present invention.
Figure 2:
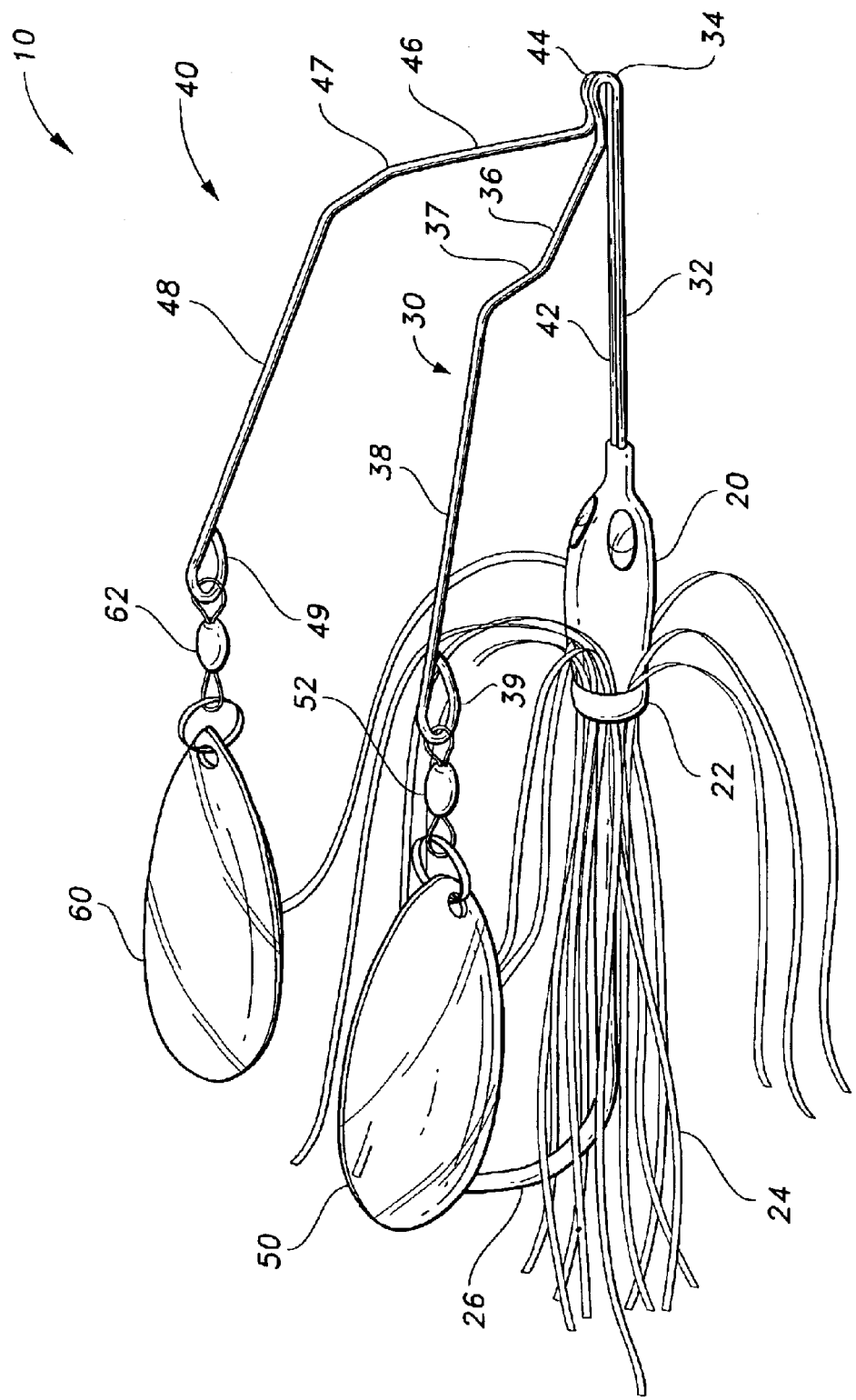
FIG. 2 is a perspective view of a preferred embodiment of the fishing lure according to the present invention.
Figure 3:
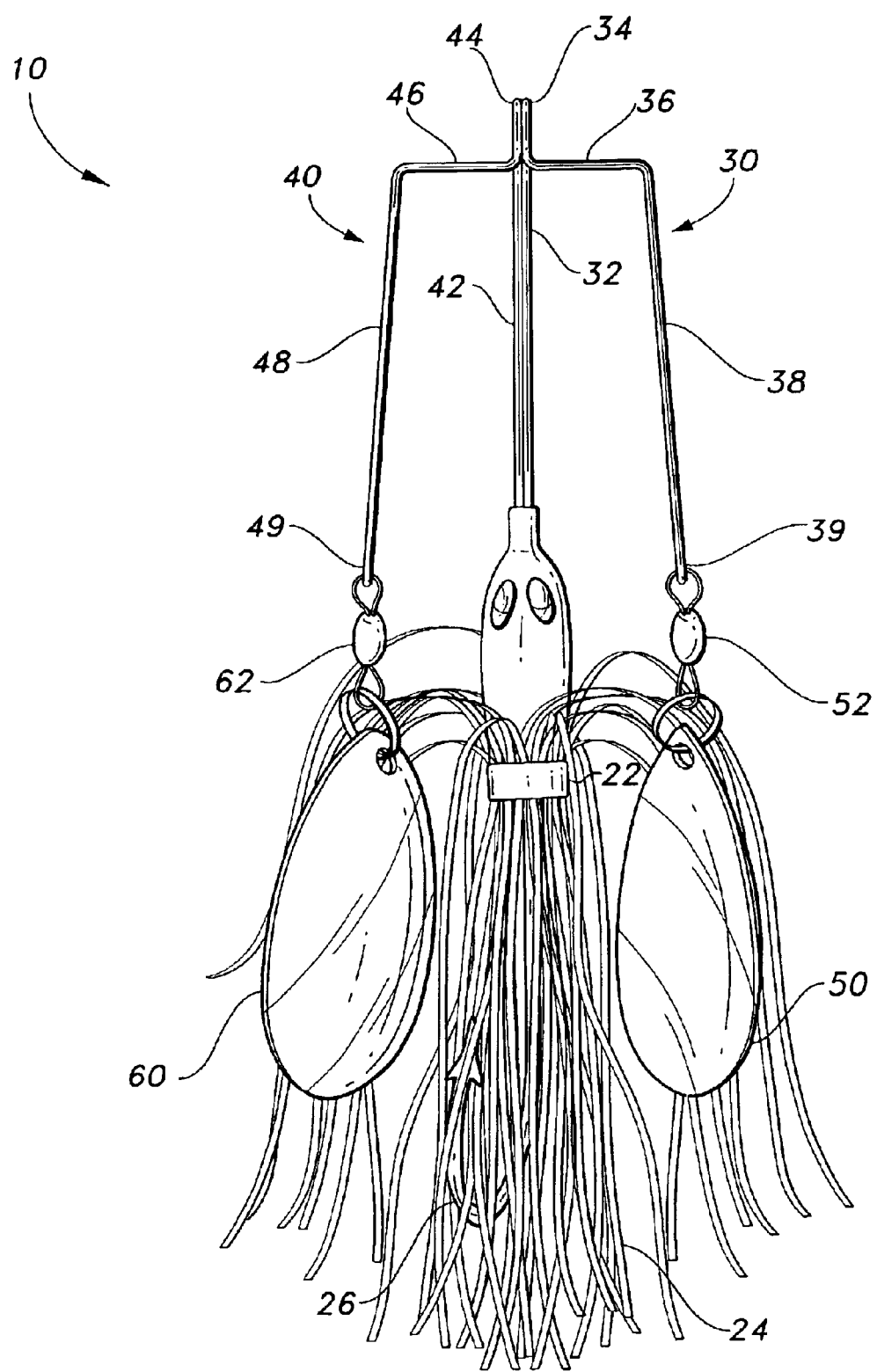
FIG. 3 is a top view of a fishing lure according to the present invention.

The present invention is a fishing lure, designated generally as 10 in the drawings. As seen in FIGS. 1 and 2, the fishing lure 10 has a weighted body 20 with a trailing hook 26 and skirt 24, in a configuration generally similar to spinnerbait lures known to sport fishermen. First and second spinner blades 50, 60, are supported above the weighted body 20, hook 26, and skirt 24 by first and second spinner blade supporting wires 30, 40.

The first and second spinner blade supporting wires 30, 40 extend forward from the weighted body 20. Each of spinner blade supporting wires 30, 40 is shaped to form a forward extending segment 32, 42 having an eye 34, 44 formed at a forward end of the forward extending segment 32, 42. A lateral segment 36, 46 extends from the eye 34, 44 lateral to the forward extending segment 32, 42, and a rearward extending segment 38, 48 extends rearward from the lateral segment 34, 44. A loop 39, 49, adapted for attachment of a spinner blade, is formed in a rearward end of the rearward extending segment 38, 48. Spinner blades 50, 60, are attached to the loops 39, 49, preferably by swivels 52, 62.

In use, the fishing lure 10 is attached to a fishing line by tying the fishing line to the eyes 34, 44. As the fishing lure 10 is pulled through the water by the fishing line, the spinner blades 50, 60 are trailed behind the rearward extending segments 38, 48 of the spinner blade supporting wires 30, 40 above the weighted body 20, the hook 26, and the skirt 24.

In the preferred embodiment, seen in FIG. 2, tuning bends 37, 47 are formed in the lateral segments 36, 46. By varying the angle of each tuning bend 37, 47, the distance between the rearward extending segments 38, 48, and thus the distance between the spinner blades 50, 60, is adjusted. It is desirable that the spinner blades 50, 60 are separated by a distance such that as the fishing lure 10 is pulled through the water, the motion imparted on the spinner blades 50, 60 causes the spinner blades 50, 60 to make contact with each other, thereby producing a clicking noise. Using the tuning bends 37, 47 to adjust the distance between the spinner blades 50, 60 allows the use of spinner blades of various sizes and shapes.

It is to be understood that the present invention is not limited to the embodiment described above, but encompasses any and all embodiments within the scope of the following claims.

I claim:

1. A fishing lure, comprising:
   a weighted body having a front and a rear;
   a fish hook extending from the rear of said weighted body; and
   first and second spinner blade supporting wires attached to and extending forward from the front of said weighted body, each spinner blade supporting wire being shaped to form a forward extending segment having an eye formed at a forward end of the forward extending segment, a lateral segment extending from the eye lateral to the forward extending segment, and a rearward extending segment extending rearward from the lateral segment and having a loop formed in a rearward end of the rearward extending segment, the loop being adapted for attachment of a spinner blade;
   wherein the first and second spinner blade supporting wires are generally symmetric to one another with respect to a plane passing between said forward extending segments; and
   wherein the first and second spinner blade supporting wires move independently of one another.

2. The fishing lure according to claim 1, further comprising:
   a first spinner blade attached to said first spinner blade supporting wire; and
   a second spinner blade attached to said second spinner blade supporting wire;
   wherein said first and second spinner blades are supported side-by-side above said weighted body and said hook.

3. The fishing lure according to claim 1, further comprising a skirt disposed on said weighted body.

4. A fishing lure, comprising:
   a weighted body having a front and a rear;
   a fish hook extending from the rear of said weighted body; and
   first and second spinner blade supporting wires attached to and extending forward from the front of said weighted body, each spinner blade supporting wire being shaped to form a forward extending segment having an eye formed at a forward end of the forward extending segment, a lateral segment extending from the eye lateral to the forward extending segment, the lateral segment having a tuning bend formed therein, and a rearward extending segment extending rearward from the lateral segment and having a loop formed in a rearward end of the rearward extending segment, the loop being adapted for attachment of a spinner blade;
   wherein the first and second spinner blade supporting wires are generally symmetric to one another with respect to a plane passing between said forward extending segments; and wherein the first and second spinner blade supporting wires move independently of one another.

5. The fishing lure according to claim 4, further comprising:

a first spinner blade attached to said first spinner blade supporting wire; and a second spinner blade attached to said second spinner blade supporting wire;

wherein said first second spinner blades are supported side-by-side above said weighted body and said hook.

6. The fishing lure according to claim 4, further comprising a skirt disposed on said weighted body.

* * * * *